United States Patent [19]

Johnson et al.

[11] Patent Number: 4,634,409

[45] Date of Patent: Jan. 6, 1987

[54] IDLER PULLEY

[75] Inventors: David W. Johnson, Bennet, Nebr.; Keith A. Tyler, Sun Prairie, Wis.

[73] Assignee: The Goodyear Tire & Rubber Company, Akron, Ohio

[21] Appl. No.: 708,314

[22] Filed: Mar. 5, 1985

[51] Int. Cl.$^4$ .............................................. F16H 55/30
[52] U.S. Cl. ..................................... 474/152; 474/153
[58] Field of Search .............................. 474/152–154, 474/205, 240, 162, 184

[56] References Cited

U.S. PATENT DOCUMENTS

| | | | |
|---|---|---|---|
| 3,472,563 | 10/1969 | Irgens | 474/153 X |
| 4,027,587 | 6/1977 | Tschinkel et al. | 474/153 X |
| 4,072,062 | 2/1978 | Morling et al. | 474/153 X |

Primary Examiner—James A. Leppink
Assistant Examiner—Thuy M. Bui
Attorney, Agent, or Firm—R. D. Thompson

[57] ABSTRACT

A streamlined, self-cleaning, non-driven pulley having a center flange extending radially from a center hub which has axially extending radial ribs on either side of the flange. The space between adjacent ribs is filled by a web sloping radially inward toward the axis of rotation of the pulley and axially outward from the center flange. In operation with a belt having two parallel longitudinal rows of internal driving lugs, the pulley flange contacts the belt between the lug rows to support the belt. Each belt lug is supported by the ribs as it passes over the pulley to maximize the width of support to the belt tensile member while under working load.

10 Claims, 5 Drawing Figures

IDLER PULLEY

BACKGROUND OF THE INVENTION

This invention relates to idler pulleys used in combination with rubber belting. In particular the idler pulley is used in a positive drive system with a belt having internal driving lugs disposed on the inner surface of the belt. The pulley is particularly directed for use in a working environment where substantial amounts of debris, dirt and other fouling material is present and tends to accumulate on the working parts of the power transmission system. In particular agricultural harvesting equipment, conveyor belts and snowmobile tracks are applications where such conditions may prevail.

Where power transmission belts having internal driving lugs are employed there is typically a driving sprocket which transmits power to the belt. This invention relates to applications where the other support for the belt is an idler pulley as distinguished from a drive sprocket or pulley. The idler pulley must function to (1) guide the belt in its proper tracking orientation, (2) prevent the belt from slipping off of the driven idler, (3) support the belt such that the tensile bearing member in the belt is maintained in a flat plane to assure maximum load carrying capability of the belt. One known idler for a positive drive, lugged belt utilizes a groove positioned between two supporting sidewalls. The driving lugs of the belt are contained within the confines of the groove to maintain the proper tracking of the belt. The problem which is indemnic with these centrally grooved idler pulleys is that debris, snow, mud accumulates in the groove and may eventually build up to an extent that the belt is forced out of the groove and the power transmission ceases. Even if only a slight amount of debris accumulates in the groove, the belt will be supported only at the top of the tooth which is only a fraction of the transverse width of the belt. When only the edges the belt are supported, the tensile bearing member in the belt will be forced out of its planar configuration and into a troughed configuration where the outermost cords of the tensile member will be bearing virtually the whole load on the belt. The operating load will prematurely cause failure of the tensile bearing cords and substantially shorten the service life of the belt. One solution to this problem is to incorporate into the idler apparatus a scraper assembly which clears the groove of debris by positioning the scraper in close tolerance to the bottom of the groove and scraping the debris out as the idler rotates. The problems associated with this solution are that the scraper assembly must be in close proximity to the rotating idler and slight impacts may bind the scraper against the rotating idler thus causing excessive wear and power loss. Of course, if the binding is severe enough, either excessive heat buildup will cause fatigue and eventual failure of the idler or the whole idler will be frozen to a stop.

Another known idler is simply a disc which contacts the bottom of the belt carcass between adjacent longitudinal rows of drive lugs. This configuration causes the belt to sag at the edges due to the lack of support under those edges. This arching of the belt throws all the tensile stress on the centermost tensile members thus reducing the load carrying capacity and service life of the belt.

The idler pulley of this invention overcomes the functional disadvantages of conventionally known idlers by providing an idler configuration that positively supports the tensile member of the belt over a broader width. An object of the invention is to provide an idler which supports the drive lugs of the belt as well as one which frictionally engages and supports the portion of the belt between the drive lug rows. An advantage of the idler pulley is that the wider belt having multiple rows of driving lugs may be maintained in a flat plane to assure maximum power transfer by the belt. The idler of this invention is self-cleaning which prevents accumulation of debris and prevents the belt from being forced off of the idler of the desired track. Additional objects and advantages of the invention will be apparent to those skilled in the art.

BRIEF DESCRIPTION OF THE INVENTION

One aspect of the invention is an idler pulley comprising an annular hub rotatable around a central axis, a center flange extending radially from said hub, a plurality of radial ribs circumferentially spaced around an axially extending away from said center flange on both sides of said hub, and webs between said ribs extending simultaneously radially inward toward the central axis and axially outward away from the center flange. An alternative embodiment of the idler pulley is one in which the webs on opposite sides of the center flange form a truncated conical surface which extends axially outward from the flange and radially inward toward the central rotational axis.

The idler pulley of the invention is put to particularly good advantage in a positive drive system comprising in combination a belt having at least a first row and a second row of longitudinally spaced internal drive lugs having a predetermined height, a sprocket adapted for receiving said lugs in driving engagement therewith, and an idler pulley for use with a belt having internal lugs having a circular center flange, a hub formed by an opposed pair of truncated conical portions extending axially outward from said flange and having radii smaller than the radius of said center flange, a plurality of radial ribs extending axially and perpendicularly outward from the hub having a radial height equal to or less than the maximum radii of the conical portions of said hub, wherein the difference between the radius of said center flange and said hub is substantially equal to the height of the internal drive lugs of said belt and said first row of internal drive lug passes on one side of said center flange and said second row of internal drive lugs passes on an opposite side of said flange and wherein the outer peripheral surface of said flange frictionally engages said belt between said first row and second row of lugs when said belt is engaged with said pulley.

DETAILED DESCRIPTION OF THE INVENTION

Figure 1:
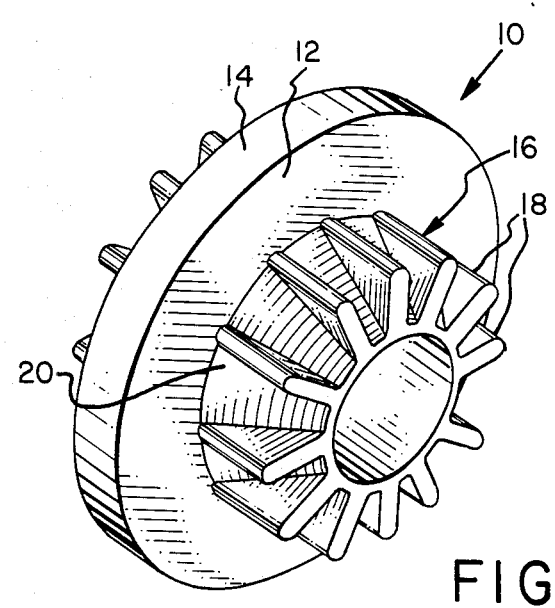
FIG. 1 is a perspective view of an embodiment of the idler pulley of the invention.
Figure 2:
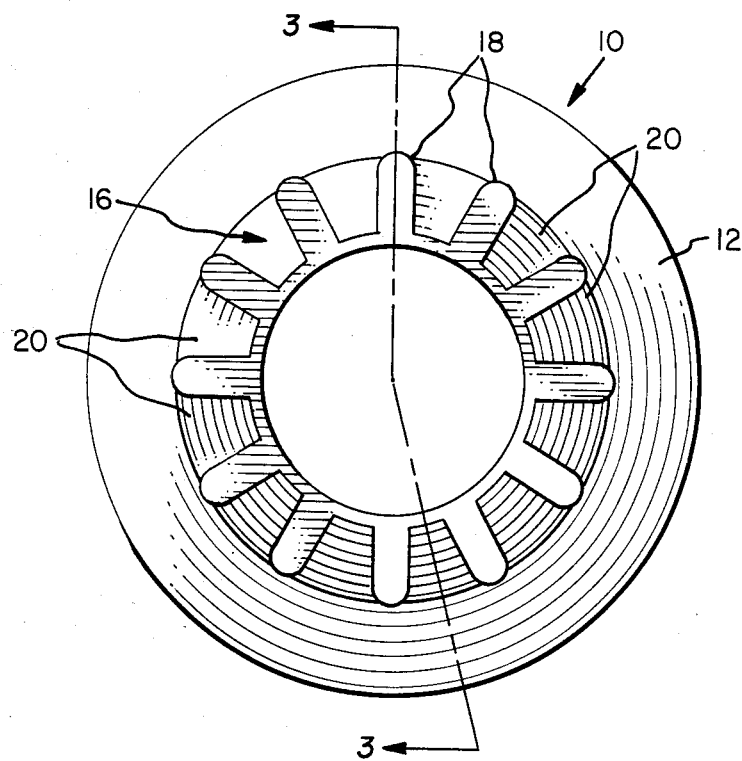
FIG. 2 is a side view of the idler pulley of the invention.
Figure 3:
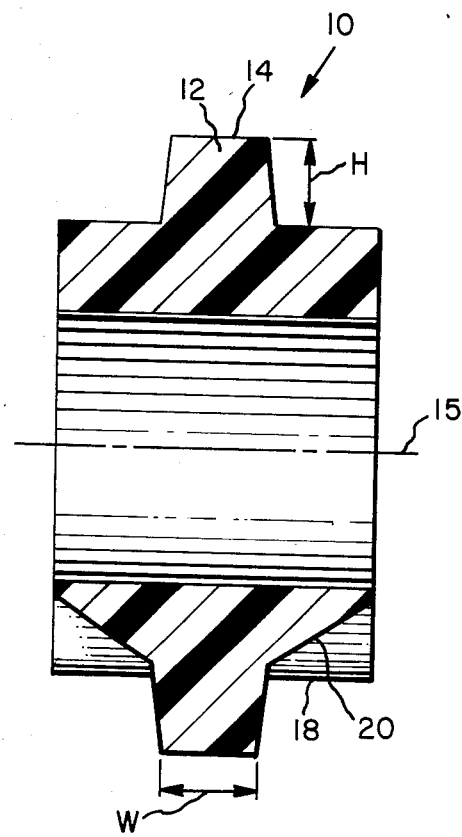
FIG. 3 is a cross-sectional view of the idler pulley taken along line 3—3 of FIG. 2.

Referring now to FIGS. 1, 2 and 3, the idler pulley of this invention is referred to by the reference number 10. The pulley 10 is comprised of an annular hub 16 having a central axis 15 which constitutes the axis of rotation of the pulley. The whole idler pulley assembly is understood to be co-axial with axis 15. A center flange 12 extends radially outward from the hub 16. The flange 12 is preferably a solid annular disk-shaped portion with a substantially flat peripheral surface 14. The peripheral surface 14 may have a slight positive or negative crown depending upon the coefficient of friction and desired interface with the belt which will run around the idler. The side portions of the flange 12 may have a slight axially outward taper to accommodate the specific configuration of drive lugs utilized. A plurality of radial ribs extend generally perpendicularly outward from the intersection of the flange 12 and hub 16 and extend radially toward the axis 15. The ribs 18 are circumferentially evenly spaced at a distance which is determined by the dimension of the portion of the belt drive lug which engages the ribs. Between each adjacent pair of ribs 18 extends a connecting web 20. The web shown in FIGS. 1, 2 and 3 is the preferred form in which the web slopes radially inward toward the central axis and axially outward away from the center flange. This angulation of the web 20 is necessary for the proper functioning of the idler pulley in order to assure that the pulley is self-cleaning during operation with an internally lugged drive belt. This web 20 assures that mud, snow and other debris which may be carried along on the inside of the belt can be pushed out of the way of the top of the drive lugs to assure proper seating of the belt around the flange 12 and on the peripheral surface 14.

It is understood that around the axis of rotation 15 and as a part of the hub 16 there will be a bearing means which allows free rotation of the pulley 10. Any friction bearing including ball bearings, roller or taper bearings or bushings may be used depending upon the severity of sideload which may be applied to the idler. The bearing means for rotationally supporting the pulley 10 is secured within the hub 16 in any conventional manner. While the embodiment shown in FIGS. 1, 2 and 3 shows a web 20 which forms a smooth conical surface, it is understood that the individual web 20 between adjacent teeth may have sloping, arcuate surfaces adjoining the radial ribs. In other words, the web 20 may in other embodiments be V-shaped between the ribs or U-shaped rather than the flat or imaginary cone shape illustrated. The outer pulley 10 may be fabricated from any metal alloy but preferably it is molded from a high performance synthetic plastic resin which has a low coefficient of friction and will allow for easy movement of debris between the ribs 18 and the adjoining web 20. Representative resins include nylon, polycarbonate, polyethylene, polyvinylchloride, polypropylene. The preferred material has been found to be one of the polyethylene family particularly the ultra-high molecular weight polyethylenes which exhibit extremely low coefficients of friction and can be easily molded into complex shapes. It is preferred that the idler be a unitary integral structure where all parts are molded or machined from a single piece of starting material.

Figure 5:
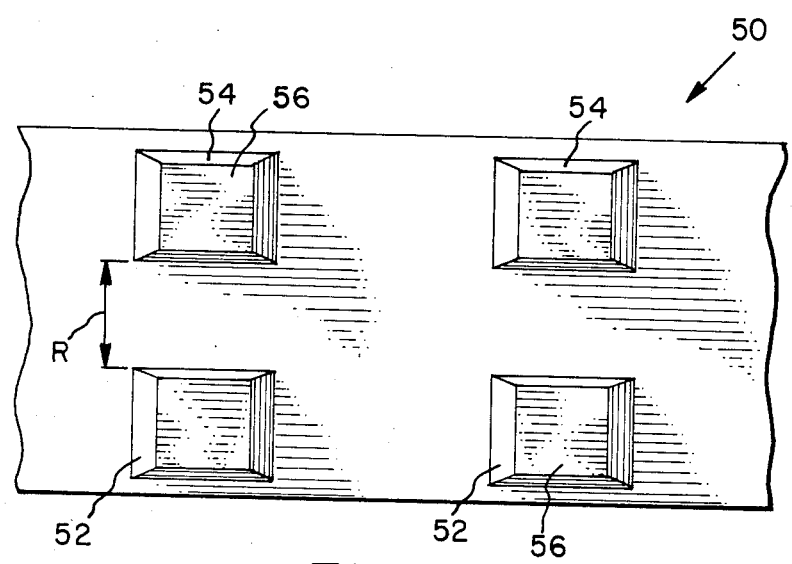
FIG. 5 is a partial sectional view of the belt with internal drive lugs taken along line 5—5 in FIG. 4 showing the drive lugs.
Figure 4:
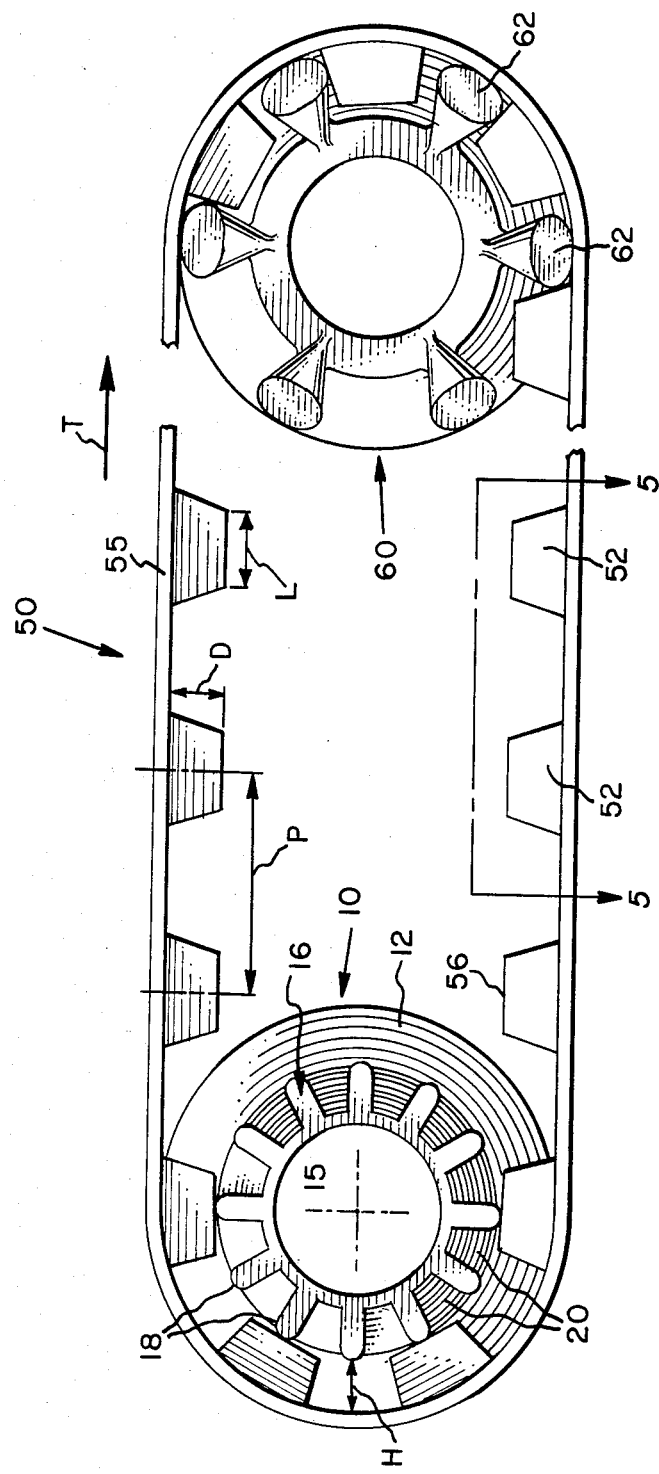
FIG. 4 is a positive drive system utilizing the idler pulley of the invention in combination with an endless belt having internal drive lugs mating with a toothed sprocket.

In FIG. 4 a positive drive power transmission system is shown utilizing an idler pulley 10 of this invention, a power transmission belt 50 and a drive sprocket 60. The power transmission belt 50 must have internal drive lugs 52 either integrally molded or fastened through the belt carcass 55 which includes a tensile member (not shown). FIG. 5 shows a partial sectional view of the belt 50 taken along line 5—5. It illustrates lugs 52 which are trapezoidal in transverse and longitudinal cross-section. When the terms transverse and longitudinal are used with reference to the belt, the longitudinal direction is understood to be the direction of travel of the belt and is generally of larger magnitude than the transverse direction which is perpendicular to the direction of travel of the belt. This trapezoidal or truncated tetrahedral structure is the most common utilized in positive drive belting. The idler pulley 10 is useful with internally lugged belts which have at least two longitudinal rows of lugs which are spaced transversely apart. It is understood that the adjacent lugs of the longitudinal rows may be either aligned with the row adjacent or may be staggered. FIG. 5 shows a row in which the longitudinal rows of lugs are aligned with the transversely adjacent row. While the trapezoidal tooth is illustrated in FIGS. 4 and 5 it is understood that any lug configuration is suitable for use with the idler of this invention since there is no requirement that the lug have any complementary shape to the pulley 10 with the exception that the space R between the first longitudinal row of lugs 52 and the second longitudinal row of lugs 54 is equal to or slightly larger than the axial width W of the flange 12. The taper of the sidewalls of the flange 12 should be complementary to the taper of the lugs 52 and 54. The longitudinal length of the idler contacting portion of the lugs 52 and 54 is shown as length L in FIG. 5.

The pulley 10 of FIG. 4 is similar in all respects to the pulley illustrated in FIGS. 1, 2 and 3. The hub 16 includes the axially projecting radial ribs 18 which contact the top surface 56 of each lug 52 in at least one point across the longitudinal length of the lug. Optimally the lug top surface 56 may have a concave curved surface complementary to the imaginary circle formed by the ribs 18. This assures maximum contact of the rib 18 with the top surface 56 of each lug. There must be a sufficient number of ribs to assure each lug will contact at least one and optimally two ribs 18 during its travel across the pulley 10. Thus, the ribs 18 must be spaced a minimum circumferential spacing of L, where L is the longitudinal dimension of the drive lug. The webs 20 which contact ribs 18, span the space between adjacent ribs assure that any debris carried along with the lugs will be ejected toward the axis of rotation 15 of the pulley 10. The depth D of the lugs 52 must be substantially equal to the height H of the flange 12 extending above the hub 16. Stated in another way, the height H is the difference between the radius of the ribs 18 and the flange 12 measured from the axis 15.

The power transmission system shown in FIG. 4 is useful especially in crop gathering devices where the belt 50 may optionally have on the belt face opposite the driving lugs 52 and 54, a cleat configuration for the purpose of gathering forage crops or standing stalks of crops such as corn. The top surface of the belt may have solid rectangular cleats, sinusoidal undulations, trapezoidal cleats or any other useful configuration.

The drive sprocket 60 is shown with driving tangs 62 which engage the lugs 52 and 54 to move the belt in the direction I indicated by the arrow. The idler pulley 10 is usable with any sprocket configuration. The sprocket configuration described in FIG. 4 is illustrative only.

Many other configurations are well known and useful in combination with the idler pulley. During the operation of the positive drive power transmission system shown in FIGS. 4 and 5 the belt is supported across the full width of the idler pulley due to the contact of the driving lugs 52 with the axially extending ribs 18 as well as the upper peripheral surface 14 of the flange 12 on the portion of the belt between the lugs 52 and 54. The axial width of the peripheral surface 14 of the flange 12 is equal to or slightly less than the distance between adjacent rows of lugs, shown in FIG. 5 as Distance R. This full support assures that the tensile bearing cords or fabrics (not shown) of the belt 50 are maintained in a flat planar orientation to assure uniform carrying of the tensile force on the belt across the full width of the belt tensile member. This characteristic of the travel over the idler pulley 10 provides longer service life and higher capacity of the belts utilized.

While certain representative embodiments and details have been shown for the purpose of illustrating the invention, it will be apparent to those skilled in this art that various changes and modifications may be made therein without departing from the intended breadth and scope of the invention.

What is claimed is:

1. An idler pulley comprising:
   an annular hub rotatable around a central axis;
   a center flange extending radially outward from said hub;
   a plurality of radial ribs circumferentially spaced around and axially extending away from said center flange on both sides of said hub said radial ribs extending generally perpendicularly outward from the intersection of said annular hub and said center flange, each of said plurality of radial ribs lying with an imaginary cylindrical surface extending axially outward from said intersection and extending radially inward toward said central axis, said ribs having a radial dimension substantially less than said center flange; and
   webs between said ribs extending radially inward toward the central axis and axially outward away from said center flange.

2. The pulley of claim 1 wherein said hub, flange, ribs and webs are an integrally formed single unit.

3. The pulley of claim 1 wherein said webs are smoothly radiused at the junction with said ribs and said center flange.

4. The pulley of claim 3 wherein said webs are generally U-shaped in axial cross-section.

5. The pulley of claim 3 wherein said webs are V-shaped in axial cross-section.

6. The pulley according to claim 5 wherein the pulley is integrally formed in a single unit.

7. The pulley of claim 1 wherein said webs form a pair of opposed truncated conical surfaces extending axially outward from the center flange and radially inward toward the central axis, said ribs extending perpendicularly outward from the flange and having a maximum radial extension less than the diameter of the center flange.

8. A pulley according to claim 7 wherein the integral unit is formed from a synthetic thermoplastic resin.

9. An idler pulley for use with an endless belt having internal lugs comprising:
   a circular center flange;
   a hub formed by an opposed pair of truncated conical portions extending axially outward from said flange and having radii smaller than the radius of said center flange;
   a plurality of radial ribs extending axially and perpendicularly outward from the hub having a radial height equal to the maximum radii of the conical portions of said hub.

10. A positive drive system comprising in combination:
    an endless belt having at least a first row and a second row of longitudinally spaced internal drive lugs having a predetermined height;
    a sprocket adapted for receiving said lugs in driving engagement therewith; and
    an idler pulley for use with an endless belt having internal lugs having a circular center flange, a hub formed by an opposed pair of truncated conical portions extending axially outward from said flange and having radii smaller than the radius of said center flange, a plurality of radial ribs extending axially and perpendicularly outward from the hub having a radial height equal to the maximum radii of the conical portions of said hub;
    wherein the difference between the radius of said center flange and said hub is substantially equal to the height of the internal drive lugs of said belts and said first row of internal drive lug passes on one side of said center flange and said second row of internal drive lugs passes on an opposite side of said flange and wherein the outer peripheral surface of said flange frictionally engages said belt between said first row and second row of lugs when said belt is engaged with said pulley.

* * * * *